(12) United States Patent
Tronquoy et al.

(10) Patent No.: US 11,035,453 B2
(45) Date of Patent: Jun. 15, 2021

(54) PULLEY DEVICE FOR A TENSIONER ROLLER OR IDLER ROLLER

(71) Applicant: Aktiebolaget SKF, Gothenburg (SE)

(72) Inventors: Nicolas Tronquoy, Fondettes (FR); Benoit Arnault, Saint-Cyr-sur-Loire (FR); Benoît Hauvespre, Saint Etienne de Chigny (FR); Samuel Viault, Saint-Antoine-du-Rocher (FR)

(73) Assignee: Aktiebolaget SKF, Gothenburg (SE)

( * ) Notice: Subject to any disclaimer, the term of this patent is extended or adjusted under 35 U.S.C. 154(b) by 291 days.

(21) Appl. No.: 16/298,481

(22) Filed: Mar. 11, 2019

(65) Prior Publication Data

US 2019/0301586 A1    Oct. 3, 2019

(30) Foreign Application Priority Data

Apr. 3, 2018  (FR) ..................... 1852857

(51) Int. Cl.
| | |
|---|---|
| *F16H 57/00* | (2012.01) |
| *F16C 19/18* | (2006.01) |
| *F16H 55/36* | (2006.01) |
| *F16H 7/20* | (2006.01) |
| *F16H 7/08* | (2006.01) |

(52) U.S. Cl.
CPC ......... *F16H 57/0031* (2013.01); *F16C 19/18* (2013.01); *F16H 7/08* (2013.01); *F16H 7/20* (2013.01); *F16H 55/36* (2013.01); *F16C 2361/63* (2013.01); *F16H 2007/0865* (2013.01)

(58) Field of Classification Search
CPC ............... F16C 13/006; F16C 2361/63; F16H 2007/0865; F16H 55/36; F16H 7/20

USPC ........................................................ 474/199
See application file for complete search history.

(56) References Cited

U.S. PATENT DOCUMENTS

| | | | | |
|---|---|---|---|---|
| 3,722,968 A | * | 3/1973 | Bomberger | F16C 13/006 384/492 |
| 4,025,132 A | * | 5/1977 | Watanabe | F16C 13/006 384/130 |
| 4,113,328 A | * | 9/1978 | Vander Meulen | B65G 39/09 384/482 |
| 4,474,562 A | * | 10/1984 | Heurich | F16H 7/1281 29/517 |
| 4,504,252 A | * | 3/1985 | Honma | F16C 13/006 474/112 |

(Continued)

FOREIGN PATENT DOCUMENTS

| | | |
|---|---|---|
| DE | 102007049906 A1 | 4/2009 |
| DE | 102008013927 A1 | 9/2009 |

*Primary Examiner* — Henry Y Liu
(74) *Attorney, Agent, or Firm* — Garcia-Zamor Intellectual Property Law; Ruy Garcia-Zamor; Bryan Peckjian

(57) ABSTRACT

The pulley device for a tensioner roller or an idler roller of a transmission element having a pulley and a bearing. The bearing is provided with a rotating external ring mounted to the pulley, and with a fixed internal ring, a radial space being defined between the rings, with rear sealing means and front sealing means closing the radial space on each axial side, and with at least one row of rotating elements arranged in the radial space. The fixed internal ring is provided on its rear side with a circumferential groove for collecting pollution which is machined on an external surface of the ring, the circumferential groove being offset axially in relation to the rear sealing means outside the radial space.

10 Claims, 1 Drawing Sheet

(56) References Cited

U.S. PATENT DOCUMENTS

| | | | | |
|---|---|---|---|---|
| 4,511,192 A * | 4/1985 | Hans | ................... | F16C 13/006 384/543 |
| 4,602,875 A * | 7/1986 | Doerr | ................... | F16H 55/48 384/547 |
| 4,610,646 A * | 9/1986 | Walter | ................. | F16C 13/006 474/174 |
| 4,792,243 A * | 12/1988 | Takeuchi | ............ | F16C 33/6618 384/486 |
| 4,810,108 A * | 3/1989 | Yajima | ................. | F16C 13/006 384/488 |
| 4,863,293 A * | 9/1989 | Sytsma | ................ | F16C 13/006 384/482 |
| 5,630,769 A * | 5/1997 | Schmidt | ................... | B60B 5/02 474/167 |
| 5,725,448 A * | 3/1998 | Kato | .................... | F16C 13/006 384/510 |
| 5,775,819 A * | 7/1998 | Kinney | ................. | F16C 13/006 384/449 |
| 6,220,982 B1 * | 4/2001 | Kawashima | ............ | F16H 55/44 474/199 |
| 6,241,257 B1 * | 6/2001 | Hauck | ................... | F16C 13/006 277/637 |
| 6,357,926 B1 * | 3/2002 | Hauck | ................... | F16C 13/006 384/546 |
| 7,011,593 B2 * | 3/2006 | Schenk | ................. | F16C 33/723 474/199 |
| 8,012,053 B2 * | 9/2011 | Filip | ................... | F16C 13/006 474/144 |
| 8,172,056 B2 * | 5/2012 | Barraud | ................ | F16D 41/069 192/45.1 |
| 8,235,851 B2 * | 8/2012 | Eidloth | ............... | F16C 33/6607 474/199 |
| 9,416,863 B2 * | 8/2016 | Schaefer | ............... | F16H 55/48 |
| 9,452,580 B2 * | 9/2016 | Swane | .................... | F16H 55/48 |
| 9,464,700 B2 * | 10/2016 | Hedman | ............... | F16C 33/586 |
| 9,506,538 B2 * | 11/2016 | Hedman | ................... | F16H 7/20 |
| 2004/0097313 A1 * | 5/2004 | Singer | .................... | F16C 41/04 474/199 |
| 2004/0235599 A1 * | 11/2004 | Ozorak | ................... | F16C 25/08 474/199 |
| 2006/0153484 A1 * | 7/2006 | Ohata | ................. | F16C 33/7823 384/484 |
| 2006/0171622 A1 * | 8/2006 | Ohata | ................. | F04B 27/1063 384/513 |
| 2007/0072714 A1 * | 3/2007 | Filip | .................... | F16C 33/723 474/144 |
| 2007/0242909 A1 * | 10/2007 | Fournier | ............... | F16C 29/045 384/132 |
| 2008/0132365 A1 * | 6/2008 | Boussaguet | ............... | F16H 7/20 474/136 |
| 2008/0230341 A1 * | 9/2008 | Barraud | ................ | F16D 41/069 192/41 A |
| 2009/0098967 A1 * | 4/2009 | Eidloth | ................... | F16C 19/26 474/199 |
| 2009/0226124 A1 * | 9/2009 | Nakagawa | .......... | F16C 33/7859 384/478 |
| 2009/0298630 A1 * | 12/2009 | Mineno | ................. | F16C 35/063 474/199 |
| 2011/0009220 A1 * | 1/2011 | Arnault | ................. | F16C 35/073 474/166 |
| 2012/0028745 A1 * | 2/2012 | Mola | .................... | F16C 13/006 474/166 |
| 2012/0142468 A1 * | 6/2012 | Lescorail | ................ | F16C 43/04 474/136 |
| 2012/0142470 A1 * | 6/2012 | Varnnoux | ............. | F16C 19/163 474/199 |
| 2014/0364258 A1 * | 12/2014 | Lescorail | ................... | F01P 5/12 474/150 |
| 2015/0267791 A1 * | 9/2015 | Hedman | ............... | F16C 13/006 474/199 |
| 2015/0300463 A1 * | 10/2015 | Albrecht | ................... | F16H 7/20 474/166 |

\* cited by examiner

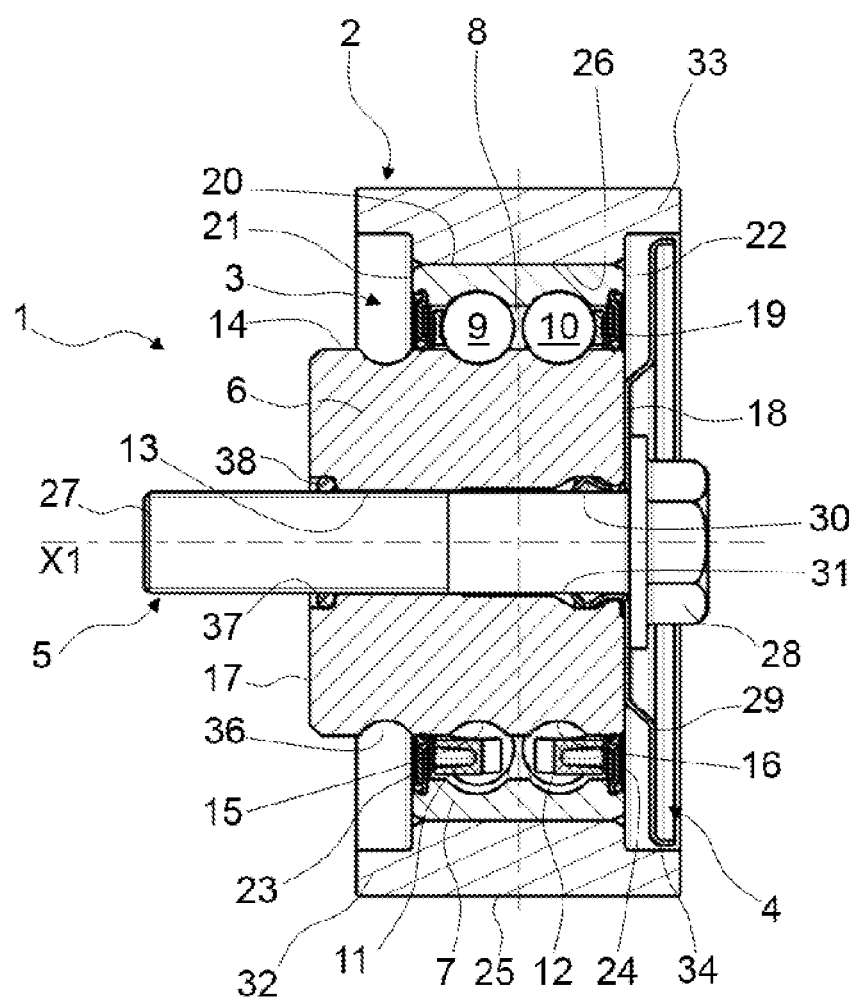

PULLEY DEVICE FOR A TENSIONER ROLLER OR IDLER ROLLER

CROSS-REFERENCE

This application claims priority to French patent application no. 1852857 filed on Apr. 3, 2018, the contents of which are fully incorporated herein by reference.

TECHNOLOGICAL FIELD

The present invention relates to the field of Pulley devices for a tensioner roller or an idler roller designed to cooperate with a transmission element, for example a timing or driving belt or a timing or driving chain of an internal combustion engine of a motor vehicle.

BACKGROUND

Suchlike rollers are generally used to maintain permanently a tension on the transmission element in a specified range or to modify locally the path taken by the latter. These are referred to respectively as tensioner rollers or idler rollers. In the case of idler rollers, the Pulley is rotatably mounted on a screw of a threaded body by means of a bearing, the roller then being fixed directly or indirectly to the engine block or to an element of a tensioner roller device, for example an articulated arm or an eccentric.

The bearing generally comprises a fixed internal ring having a bore traversed by the screw, a rotating external ring surmounted by the Pulley, and at least one row of rotating elements interposed between the rings.

Suchlike devices are often equipped with sealing joints or additional protection flanges, helping to protect the device from pollution or from projections originating from the external environment.

Particles or other elements of pollution may infiltrate, however, and these may accumulate over time in the immediate proximity of the sealing means of the bearing. The sealing means may wear, and the risk of the infiltration of pollution into the bearing chamber increases with the period of utilization of the Pulley device. This internal pollution may result in accelerated deterioration of the internal components of the bearing, in particular the contact surfaces between the rotating elements and the rings. This in turn can also result in a reduction in the quality of the rotating mechanical connection provided by the Pulley device, and in a reduced service life of its internal components. The risk of breakage, in particular in operating mode, is likewise greater.

SUMMARY

The present invention proposes to address this inconvenience.

More specifically, the present invention proposes to make available a Pulley device that is resistant under conditions of high pollution, particularly cost-effective, of easy and secure assembly, forming a non-removable sub-assembly, and of reduced axial and radial overall dimensions.

The invention concerns a Pulley device for a tensioner roller or an idler roller for a transmission element comprising a Pulley having an external surface intended to cooperate with the transmission element, and a bearing.

The bearing is provided with a rotating external ring surmounted by the Pulley and is provided with a bore having at least one external raceway, with a fixed internal ring having a bore intended to receive a screw, with an external surface having at least one internal raceway, a rear lateral surface intended to come into contact with a support of the device, and a front lateral surface with which a head of a screw is intended to come into contact, the rings being coaxial and forming a radial space between them, with rear sealing means and front sealing means closing the radial space on each axial side, and with at least one row of rotating elements arranged in the radial space and between the internal and external raceways.

According to the invention, the fixed internal ring is provided on its rear side with a circumferential groove for collecting pollution which is machined on an external surface of the ring. The circumferential groove is offset axially in relation to the rear sealing means outside the radial space.

According to other advantageous, but not mandatory, characteristics of the invention, taken in isolation or in combination:

The Pulley device comprises an annular protection flange with an essentially radial portion of an internal edge forming a bore, and of an external edge coming into the immediate proximity of the Pulley to form a narrow passage, the essentially radial portion being in contact with the front lateral surface of the fixed internal ring.

The flange comprises retention means with the fixed internal ring of the bearing.

The flange comprises an annular collar extending axially from the external edge of the essentially radial portion.

The collar is cylindrical.

The collar is frustoconical.

The internal ring of the bearing is integral.

The internal ring of the bearing comprises a track element provided with an external surface having at least one internal raceway for the rotating elements, and a spacer provided with an external surface mounted in a bore of the track element, the bore being intended to receive the screw, a rear lateral surface intended to come into contact with a support of the device, and with a front lateral surface, with which a head of a screw is intended to come into contact.

The circumferential groove for collecting pollution is provided on an external surface of the track element of the internal ring.

The circumferential groove for collecting pollution is provided on an external surface of the spacer of the internal ring.

The Pulley device comprises retention means intended to cooperate with the screw.

The bore of the fixed internal ring comprises an internal circumferential groove in which is housed an annular O-ring cooperating with the screw.

A cage ensures the retention of the circumferential spacing of the rotating elements.

The at least one internal raceway consists of a circumferential groove having in axial section a concave internal profile adapted for the rotating elements.

The rotating elements are balls.

The at least one raceway has in its axial section a toroidal profile adapted for the balls.

The circumferential groove for collecting pollution has in its axial section a toroidal profile.

The circumferential groove for collecting pollution is identical to the circumferential groove forming the internal raceway.

The fixed internal ring comprises a cylindrical external surface provided with the at least one raceway and with the circumferential groove for collecting pollution.

The Pulley comprises a front axial projecting portion.

The Pulley comprises a rear axial projecting portion.

The front axial projecting portion radially surrounds the external edge of the flange.

The rear axial projecting portion radially surrounds the circumferential groove for collecting pollution.

The Pulley is mounted on an external surface of the rotating external ring of the bearing.

The Pulley and the rotating external ring of the bearing are formed integrally, the rotating external ring being provided with an external surface intended to cooperate with the transmission element.

The Pulley is made of metal, for example steel.

The Pulley is made of a plastic material, for example polyamide.

The Pulley is formed by overmoulding a plastic material on the external ring of the bearing.

The flange is made of metal, for example steel.

The flange is made of a plastic material, for example polyamide.

BRIEF DESCRIPTION OF THE DRAWINGS

The present invention will be more readily appreciated from a perusal of the detailed description of an embodiment provided by way of an in no way restrictive example, and illustrated by the single FIGURE annexed hereto, which represents a view in axial cross section of a Pulley device according to the invention.

DETAILED DESCRIPTION

As may be appreciated in the FIGURE, a Pulley device for a tensioner roller or an idler roller of a belt, referenced with 1 in its entirety, has a geometrical axis X1, and comprises a Pulley 2 adapted to cooperate with a transmission element (not represented here) such as a belt or a chain, a bearing 3, a protection flange 4 and a screw 5.

The bearing 3 comprises a fixed internal ring 6, a rotating external ring 7, the rings 6, 7 being coaxial about the axis X1 and forming a radial space 8 between them. The bearing 3 likewise comprises two rows of rotating elements 9 and 10, realized here in the form of balls disposed between the rings, and cages 11 and 12 respectively ensuring the retention of the circumferential spacing of the rotating elements 9 and 10.

The internal rings 6 and external rings 7 are concentric. In the illustrated embodiment, the rings are solid, that are obtained by machining or grinding with the removal of material on the basis of metal tubes, bars, forgings or rolled blanks.

The internal ring 6 comprises a bore 13, an external cylindrical surface 14 provided with raceways 15, 16 having a concave internal profile in axial section and being of toroidal form adapted for the rotating elements 9, 10, and two rear 17 and front 18 lateral surfaces.

The external ring 7 comprises a cylindrical bore 19 provided with raceways (not referenced here) having a concave internal profile in axial section and being of toroidal form adapted for the rotating elements 9, 10, an external cylindrical surface 20 on which the Pulley 2 is mounted, and two rear 21 and front 22 lateral surfaces.

The fixed internal ring 6 extends axially beyond the rotating external ring 7 in a rear axial direction directed towards a support on which the Pulley device 1 is intended to be mounted. The rear lateral surface 17 is intended to form a contact surface for the bearing 3 against the support for the device 1.

The bearing 3 advantageously comprises on each axial side an annular seal 23, 24 to close the radial space 8 existing between the rings 6, 7 and in the interior of which the rotating elements 9, 10 are housed.

The sealing joints 23, 24 each advantageously comprise a first fixed extremity in a circumferential groove provided in the bore 19 of the external ring 7, and a second extremity formed by a lip in sliding contact against the external cylindrical surface 14 of the internal ring 6. The radial space 8 is thus closed axially in a sealed manner between the two sealing joints 23, 24.

In an alternative manner, the bearing may comprise a number of different rows of rotating elements arranged between the external and internal rings, for example a single row of rotating elements.

In an alternative manner, the bearing may comprise other types of rotating elements, for example taper rollers, needle rollers, or even taper roller bearings. Alternatively, the bearing may be a plain bearing.

In this embodiment, the internal ring 6 is formed integrally. According to an alternative embodiment (not represented here), the bearing 3 may comprise an annular spacer mounted in the internal ring 6.

The Pulley 2 comprises an external cylindrical surface 25 intended to cooperate with a transmission element such as a belt or a chain, and an internal surface 26 integral with the external ring 7. The Pulley has an essentially tubular form and is centered on the central axis X1.

The Pulley 2 may be made advantageously of a plastic material, and may preferentially be made of polyamide, for example PA6 or PA66. The Pulley 2 may advantageously be formed by overmoulding a plastic material on the external ring 7 of the bearing 3. This results in excellent cohesion between these components. In an alternative manner, the Pulley 2 may be made of a metallic material, for example steel, and may be press fitted onto the external cylindrical surface 20 of the external ring 7. The Pulley 2 may also have other forms that are optimized in relation to the requirements of the application.

According to another alternative, the external surface 20 of the external ring 7 may cooperate directly with a transmission element, and in so doing forms the Pulley for the Pulley device 1.

The screw 5 comprises a body 27 and a head 28 at an axial extremity of the body 27. The body 27 is housed in the bore 13 of the bearing 3 and extends axially beyond the rear lateral surface 17 of the fixed internal ring 6. The body 27 comprises a threaded portion intended to be screwed into a corresponding threaded opening of the support for the Pulley device 1.

The protection flange 4 comprises an essentially radial portion 29 extending between an internal edge forming the bore of the flange 4 and an external edge.

The essentially radial portion 29 comes into contact with the front lateral surface 18 of the internal ring 6 situated opposite the support on which the device 1 is intended to be mounted.

The bore 13 of the fixed internal ring 6 of the bearing 3 advantageously comprises an internal circumferential groove 37 at its rear extremity. An annular O-ring 38 is inserted in the internal circumferential groove 37 to retain the body 27 of the screw 5 axially and radially in the Pulley device 2. In an alternative manner, the Pulley device 1 may comprise any other means adapted for the purpose of retaining the screw 5.

The head 28 of the screw 5 exhibits a relatively plane surface coming into contact with the essentially radial portion 29 of the flange 4, the portion 29 being axially wedged between the head 28 of a screw 5 and the internal ring 6 of the bearing 3. According to a variant (not illustrated here), a washer may be interposed between the head of a screw and the essentially radial portion of the flange.

In an advantageous manner, the flange 4 likewise comprises an axial portion 30 extending axially from the internal edge of the radial portion 29. The axial portion 30 is accommodated in and interacts with the bore of 13 of the internal ring 6 of the bearing 3. The axial portion 30 may be annular and of essentially tubular form, or even discrete and being formed for a plurality of tongues. The axial portion 30 permits centring of the flange 4 in relation to the bearing 3 on the one hand, and the Pulley 2 on the other hand.

In the illustrated embodiment, the bore 13 is provided with a circumferential groove 31 on its front extremity. The axial portion 30 is radially deformed in such a way as to be partially accommodated in the circumferential groove 31. The flange 4 is retained axially and radially with the bearing 3 by means of its axial portion 30 cooperating with the walls of the circumferential groove 31 provided in the fixed internal ring 6. In an alternative manner, the circumferential groove may be realized in the bore of a spacer of the bearing if the latter is thus equipped.

In an alternative manner (not represented here), the axial portion of the flange may be press fitted in the bore of the bearing. According to other variants, the axial portion is mounted in an integrated manner in the mounting bore of the bearing by some other adapted means, for example by gluing.

The Pulley 2 comprises a rear axially projecting portion 32 which extends axially beyond the rear lateral surface 21 of the external ring 7 in the rear axial direction of the device 1. The Pulley 2 comprises a front axially projecting portion 33 which extends axially beyond the front lateral surface 22 of the external ring 7 in the front axial direction of the device 1. The external edge of the essentially radial portion 29 of the flange 4 extends in immediate proximity to the front axially projecting portion 33 of the Pulley 2. The front axially projecting portion 33 radially surrounds the external edge of the essentially axial portion 29 of the flange 4 to form a narrow passage which reduces the risk of intrusion of external pollution in proximity to the bearing 3.

In the illustrated embodiment, the flange 4 advantageously comprises a cylindrical annular collar 34 extending axially from the external edge of the essentially radial portion 29 in the front axial direction. The collar 34 may alternatively be frustoconical, or of some other form adapted to prevent the entry of pollution. The collar 34 may alternatively extend axially in the rear axial direction of the device 1.

The flange is formed by cutting followed by stamping of a strip of metal, for example made of steel. In an alternative manner, the flange may be made of a plastic material, for example polyamide.

Consistent with the invention, the fixed internal ring 6 of the bearing 3 is provided on its rear side with a circumferential groove 36 for collecting pollution.

The circumferential groove 36 is machined on the external cylindrical surface 14 of the external ring 6. The circumferential groove 36 is offset axially towards the rear of the internal ring 6 in relation to the rear sealing means 23, such that the circumferential groove 36 is situated outside the radial space 8.

The rear axial projecting portion 32 of the Pulley 2 radially surrounds the circumferential groove 36 for collecting pollution.

In a particularly advantageous manner, the circumferential groove 36 for collecting pollution is of a form similar to the raceways 15 and 16 provided on the cylindrical external surface 14. The circumferential groove 36 thus has in axial section axial a concave internal profile of toroidal form. Thanks to this embodiment, the circumferential groove 36 may be machined in the same manner as the raceways 15, 16, with the same form and the same dimensions on a same surface 14. In an alternative manner, the circumferential groove 36 may have any other form in axial section adapted for collecting pollution, for example parallelepipedal, triangular or other.

Thanks to the invention, the pollution which manages to cross the passage between the support for the device 1 and the Pulley 2 at the rear of the device 1 is collected in the circumferential groove 36 at a certain distance from the rear seal 23.

Furthermore, the technical characteristics of the different embodiments may be combined between them, in totality and for only certain of them. The Pulley device may thus be adapted in terms of cost, performance and simplicity of implementation.

What is claimed is:

1. A pulley device for a tensioner roller or an idler roller for a transmission element comprising:
   a pulley having an external surface intended to cooperate with the transmission element, and
   a bearing provided with a rotating external ring mounted to the pulley and provided with a bore having at least one external raceway, with a fixed internal ring having a bore intended to receive a screw, with an external surface having at least one internal raceway, with a rear lateral surface intended to come into contact with a support for the device, and a front lateral surface with which a head of a screw is intended to come into contact, the rings being coaxial and forming a radial space between them, with rear sealing means and front sealing means closing the radial space on each axial side, and with at least one row of rotating elements arranged in the radial space and between the internal and external raceways, wherein
   the fixed internal ring is provided on its rear side with a circumferential groove for collecting pollution which is machined on an external surface of the ring, the circumferential groove being offset axially in relation to the rear sealing means outside the radial space.

2. The pulley device according to claim 1, wherein the rotating elements are balls, and the at least one internal raceway consists of a circumferential groove having in axial section a concave internal profile of toroidal form adapted for the balls.

3. The pulley device according to claim 2, wherein the circumferential groove for collecting pollution is identical to the circumferential groove forming an internal raceway and has a toroidal profile in axial section.

4. The pulley device according to claim 1, wherein the fixed internal ring comprises a cylindrical external surface provided with the at least one raceway and with the circumferential groove for collecting pollution.

5. The pulley device according to claim 1, wherein the pulley comprises a rear axial projecting portion that radially surrounds the circumferential groove for collecting pollution.

6. The pulley device according to claim 1, wherein the pulley device comprises an annular protection flange with a radial portion of the interior edge forming a bore, and the exterior edge coming into immediate proximity to the pulley to form a narrow passage, the radial portion being in contact with the front lateral surface of the fixed internal ring.

7. The pulley device according to claim 6, wherein the flange comprises retention means with the fixed internal ring of the bearing.

8. The pulley device according to claim 6, wherein the flange comprises an annular collar extending axially from the external edge of the radial portion.

9. The pulley device according to claim 1, wherein the pulley device comprises retention means intended to cooperate with the screw.

10. The pulley device according to claim 9, wherein the bore of the fixed internal ring comprises an internal circumferential groove that houses an annular O-ring cooperating with the screw.

\* \* \* \* \*